Patented July 6, 1948

2,444,807

UNITED STATES PATENT OFFICE 2,444,807

COPOLYMERS OF VINYL FURANE AND ALPHA-ALKYL ACRYLONITRILE

Albert M. Clifford, Stow, Ohio, assignor to Wingfoot Corporation, Akron, Ohio, a corporation of Delaware No Drawing. Application May 20, 1943, Serial No. 487,810

3 Claims. (Cl. 260—84)

This invention relates to plastic masses having useful properties and to methods of preparing the same. More particularly, it relates to plastic masses prepared by copolymerizing vinyl furane with an alkyl-substituted acrylic nitrile, such as methacrylic nitrile, ethacrylic nitrile, etc.

The copolymerization may be accomplished by any of the methods customarily applied to the preparation of copolymers of this type, such as by heating the materials under anhydrous conditions with or without a solvent, or in aqueous emulsions in the presence of suitable polymerization catalysts, promoters, and modifying agents. The emulsion type of polymerization has been found to be very satisfactory, various emulsifying agents being employed therewith, such as sodium oleate, the higher sodium alkyl sulfates, sodium alkylated naphthalene sulfonates, etc. The monomers may be present in various proportions, but it has been found that satisfactory results are obtained when each of the monomers in a mixture of the vinyl furane and the unsaturated nonhydrocarbon monomer is present to the extent of at least 25 per cent of the total monomer. That is to say, the vinyl furane may be present in amount from 25 to 75 per cent of the whole, and the other constituent will, consequently, be present in the inverse proportion. Of course, these proportions may be departed from to some extent where polymerized masses with special properties are desired.

The following examples illustrate the preparation of the materials of the invention, but it will be understood that the same is not limited thereto. A temperature in the neighborhood of 50° C. may be employed for the polymerization, and this temperature maintained until polymerization is complete. This temperature may be raised or lowered somewhat, effective polymerization taking place at room temperature and a temperature as high as 80° C. being employed in some instances. However, the temperature used will be selected with due regard to the type of product desired and the time of polymerization.

Example 1

An emulsion was made up containing 4 parts of methacrylonitrile and 8 parts of vinyl furane, the emulsion also containing 15 parts of 3 per cent sodium oleate, 0.36 part of carbon tetrachloride and 0.10 part of sodium perborate. This was enclosed in a glass bomb, and the polymerization was conducted at 50° C. for 48 hours with agitation, the temperature was then raised to 75° C. and the heating continued for an additional 48 hours. The product was a resin-like powder, and a yield of 96.7 per cent was obtained.

Example 2

Another batch was made up similar to that treated in Example 1, but the ratio of methacrylonitrile and vinyl furane was reversed; that is, 66.7 per cent to 33.3 per cent. This was polymerized for 48 hours at a temperature of 50° C. and for an additional 182 hours at 75° C. under agitation. A 95 per cent yield was obtained of a solid product which could be sheeted on a rubber mill.

The polymerized masses obtained by following the procedure of the foregoing examples, as well as others prepared by copolymerization of vinyl furane with other alkyl-substituted acrylic nitriles, may be used in a variety of ways and applications commonly employed for plastics. It may be plasticized and compounded with other synthetic polymers or copolymers, either rubber like or otherwise, with rubber, with polyesters (di- or polybasic acid-glycol condensation polymers), polyamides, polyester amides, etc. The invention is not limited to the examples disclosed but is generally applicable to products obtainable by the copolymerization of vinyl furane and any alkyl-substituted acrylic nitrile.

This application is a continuation in part of my application Serial No. 202,270, filed April 15, 1938, now abandoned.

What I claim is:

1. A copolymer resulting from the polymerization of a mixture of copolymerizable monomers consisting of 33.33 to 66.66% of vinyl furane, and 66.66 to 33.33% of alpha-alkyl acrylonitrile.

2. A copolymer resulting from the polymerization of a mixture of copolymerizable monomers consisting of 66.66% of vinyl furane, and 33.33% of alpha-alkyl acrylonitrile.

3. A copolymer resulting from the polymerization of a mixture of copolymerizable monomers consisting of 33.33% of vinyl furane, and 66.66% of alpha-alkyl acrylonitrile.

ALBERT M. CLIFFORD.

REFERENCES CITED

The following references are of record in the file of this patent:

UNITED STATES PATENTS

| Number | Name | Date |
|---|---|---|
| 1,911,722 | Sorenson | May 30, 1933 |
| 2,117,321 | Hill | May 17, 1938 |

FOREIGN PATENTS

| Number | Country | Date |
|---|---|---|
| 487,604 | Great Britain | June 22, 1938 |